(12) United States Patent
Marsh et al.

(10) Patent No.: US 11,616,818 B2
(45) Date of Patent: *Mar. 28, 2023

(54) DISTRIBUTED CONTROL OF MEDIA CONTENT ITEM DURING WEBCAST

(71) Applicant: Spotify AB, Stockholm (SE)

(72) Inventors: Brendan Marsh, Stockholm (SE); Felix Bruns, Stockholm (SE); Niklas Wahlen, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,330

(22) Filed: Sep. 30, 2020

(65) Prior Publication Data

US 2021/0029178 A1    Jan. 28, 2021

Related U.S. Application Data

(63) Continuation of application No. 16/045,332, filed on Jul. 25, 2018, now Pat. No. 10,826,949, which is a
(Continued)

(51) Int. Cl.
*G06F 15/16* (2006.01)
*H04L 65/1089* (2022.01)
(Continued)

(52) U.S. Cl.
CPC ........ *H04L 65/1089* (2013.01); *G11B 27/105* (2013.01); *H04L 51/046* (2013.01);
(Continued)

(58) Field of Classification Search
CPC ............... H04L 65/1089; H04L 51/046; H04L 65/1059; H04L 65/4076; H04L 65/4084;
(Continued)

(56) References Cited

U.S. PATENT DOCUMENTS

| 5,931,901 A | 8/1999 | Wolfe et al. |
| 9,021,370 B1 | 4/2015 | Carlson |

(Continued)

OTHER PUBLICATIONS

Hunsinger, Leslie. "Twitch 101: Song Request Using Nightbot". Apr. 7, 2015. pp. 1-7. (Year: 2015).*
(Continued)

*Primary Examiner* — Imad Hussain
(74) *Attorney, Agent, or Firm* — Merchant & Gould P.C.

(57) ABSTRACT

Disclosed embodiments include systems and methods for distributed control of media-playback components of a webcast. In an example, a webcast presenter's device can include a webcast compositing engine for creating a webcast from a variety of data sources, a media-playback engine for playing media content items, and a message processing engine for processing messages sent from audience members to the presenter. The message processing engine can obtain the messages and parse the messages for tokens indicative of a requested media content item. The message processing engine, having identified the requested media content item, can then cause the media-playback engine to play the requested content or add it to a queue.

20 Claims, 6 Drawing Sheets

Related U.S. Application Data continuation of application No. 15/672,036, filed on Aug. 8, 2017, now Pat. No. 10,063,600.

(60) Provisional application No. 62/521,941, filed on Jun. 19, 2017.

(51) Int. Cl.
| | |
|---|---|
| *H04L 51/046* | (2022.01) |
| *H04N 21/61* | (2011.01) |
| *H04N 21/84* | (2011.01) |
| *H04L 65/1059* | (2022.01) |
| *H04N 21/854* | (2011.01) |
| *G11B 27/10* | (2006.01) |
| *H04N 21/2743* | (2011.01) |
| *H04L 65/611* | (2022.01) |
| *H04L 65/612* | (2022.01) |
| *H04N 7/173* | (2011.01) |
| *H04N 21/6587* | (2011.01) |
| *H04N 21/43* | (2011.01) |

(52) U.S. Cl.
CPC ........ *H04L 65/1059* (2013.01); *H04L 65/611* (2022.05); *H04L 65/612* (2022.05); *H04N 21/2743* (2013.01); *H04N 21/6125* (2013.01); *H04N 21/84* (2013.01); *H04N 21/854* (2013.01); *H04N 7/17318* (2013.01); *H04N 21/4302* (2013.01); *H04N 21/6587* (2013.01)

(58) Field of Classification Search
CPC ............. G11B 27/105; H04N 21/2743; H04N 21/6125; H04N 21/84; H04N 21/854; H04N 7/17318; H04N 21/4302; H04N 21/6587

USPC ........................................................ 709/206
See application file for complete search history.

(56) References Cited

U.S. PATENT DOCUMENTS

| | | | |
|---|---|---|---|
| 9,305,303 | B2 | 4/2016 | Farlie |
| 9,516,370 | B1* | 12/2016 | Weel ..................... H04W 8/005 |
| 9,723,348 | B2 | 8/2017 | Chen |
| 10,063,600 | B1 | 8/2018 | Marsh et al. |
| 10,826,949 | B2* | 11/2020 | Marsh ................. H04L 65/1059 |
| 2004/0019497 | A1* | 1/2004 | Volk ................... H04N 21/6581 |
| | | | 707/E17.109 |
| 2005/0021418 | A1 | 1/2005 | Marcus et al. |
| 2006/0068818 | A1 | 3/2006 | Leitersdorf et al. |
| 2007/0025194 | A1 | 2/2007 | Morse et al. |
| 2007/0149115 | A1 | 6/2007 | White et al. |
| 2008/0307454 | A1 | 12/2008 | Ahanger et al. |
| 2009/0259719 | A1 | 10/2009 | Kindberg et al. |
| 2011/0271208 | A1 | 11/2011 | Jones et al. |
| 2013/0246522 | A1 | 9/2013 | Bilinski et al. |
| 2014/0157136 | A1 | 6/2014 | Bellumio et al. |
| 2014/0189731 | A1 | 7/2014 | Emerson, III |
| 2015/0288645 | A1 | 10/2015 | Gianattasio et al. |
| 2017/0251040 | A1 | 8/2017 | Archambault et al. |
| 2017/0289202 | A1 | 10/2017 | Krasadakis |
| 2018/0189408 | A1 | 7/2018 | O'Driscoll et al. |
| 2018/0367484 | A1* | 12/2018 | Rodriguez ............. H04L 67/75 |
| 2018/0367497 | A1 | 12/2018 | Qian et al. |

OTHER PUBLICATIONS

Hamilton, William A. et al. "Streaming on Twitch: Fostering Participatory Communities of Play within Live Mixed Media," CHI/ACM. pp. 1-10 (1315-1324) (2014).

* cited by examiner

DISTRIBUTED CONTROL OF MEDIA CONTENT ITEM DURING WEBCAST

CROSS-REFERENCE TO RELATED APPLICATION

This application is a Continuation of U.S. application Ser. No. 16/045,332, filed Jul. 25, 2018, which is a continuation of U.S. application Ser. No. 15/672,036, filed Aug. 8, 2017, which claims the benefit of U.S. Provisional Application No. 62/521,941, filed Jun. 19, 2017, and are titled "DISTRIBUTED CONTROL OF MEDIA CONTENT ITEM DURING WEBCAST," the disclosures of which are hereby incorporated by reference in their entireties. To the extent appropriate a claim of priority is made to each of the above-disclosed applications.

BACKGROUND

Webcasts are a popular way for presenters to provide content to an audience over a network. For example, during a webcast, a presenter can send media content, such as audio or video, across the Internet to audience members. Webcasts can be used to provide a variety of content, including news content, educational material, live performances (e.g., music, comedy, etc.), interactive discussions, and other forms of media content. One popular kind of webcast involves a presenter playing a video game for audience members to watch. For example, the webcast can be a streaming feed of the presenter playing a game.

Webcasts often include a live component such that audience members and one or more presenters are able to interact with each other. However, the webcasts need not be in real-time. The webcast can include a delay for network streaming purposes (e.g., to allow for buffering to smooth content presentation) or a broadcast delay (e.g., a "tape" delay). During webcasts, audience members can interact with the presenter by, for example, sending the presenter messages. The messages from audience members can sometimes include requests that the presenter play particular songs or other media content items. While a presenter may want to engage with his or her audience by responding to these requests, there are many challenges in doing so. For example, the process can be inefficient and raise cybersecurity concerns.

SUMMARY

In general terms, this disclosure is related to systems and methods for distributed control of media-playback components of a webcast.

One aspect can include a system having: a processing unit and a non-transitory computer-readable medium. The computer-readable medium can include message processing engine instructions, media-playback engine instructions, and webcast compositing engine instructions. The message processing engine instructions, when executed by the processing unit, can cause the processing unit to: receive a message; parse the message for a token; and add a media content item associated with the token to a play queue. The media-playback engine instructions, when executed by the processing unit, can cause the processing unit to play the media content item based, in part, on the play queue; and provide metadata regarding the playing media content item or the play queue. The webcast compositing engine instructions, when executed by the processing unit, can cause the processing unit to: composite a webcast and provide the webcast to a webcast host. Compositing the webcast can include obtaining webcast input data, receiving the provided metadata, and combining the metadata with the webcast input data.

In another aspect, a method includes receiving a message; parsing the message to determine whether the message includes a token; determining a media content item associated with the token; adding the media content item to a play queue; playing queued content from the play queue; and causing the metadata regarding the playing queued content to be made available to a webcast compositing engine.

In yet another aspect a non-transitory computer-readable medium can include instructions that, when executed by a processor, cause the processor to: receive a message; parse the message to determine whether the message includes a token; determine a message weight associated with the message; modify a media content item play queue based on the message weight and the token; play a media content item from the media content item play queue; and cause metadata regarding the playing media content item to be provided to a webcast compositing engine.

DETAILED DESCRIPTION

Figure 1:
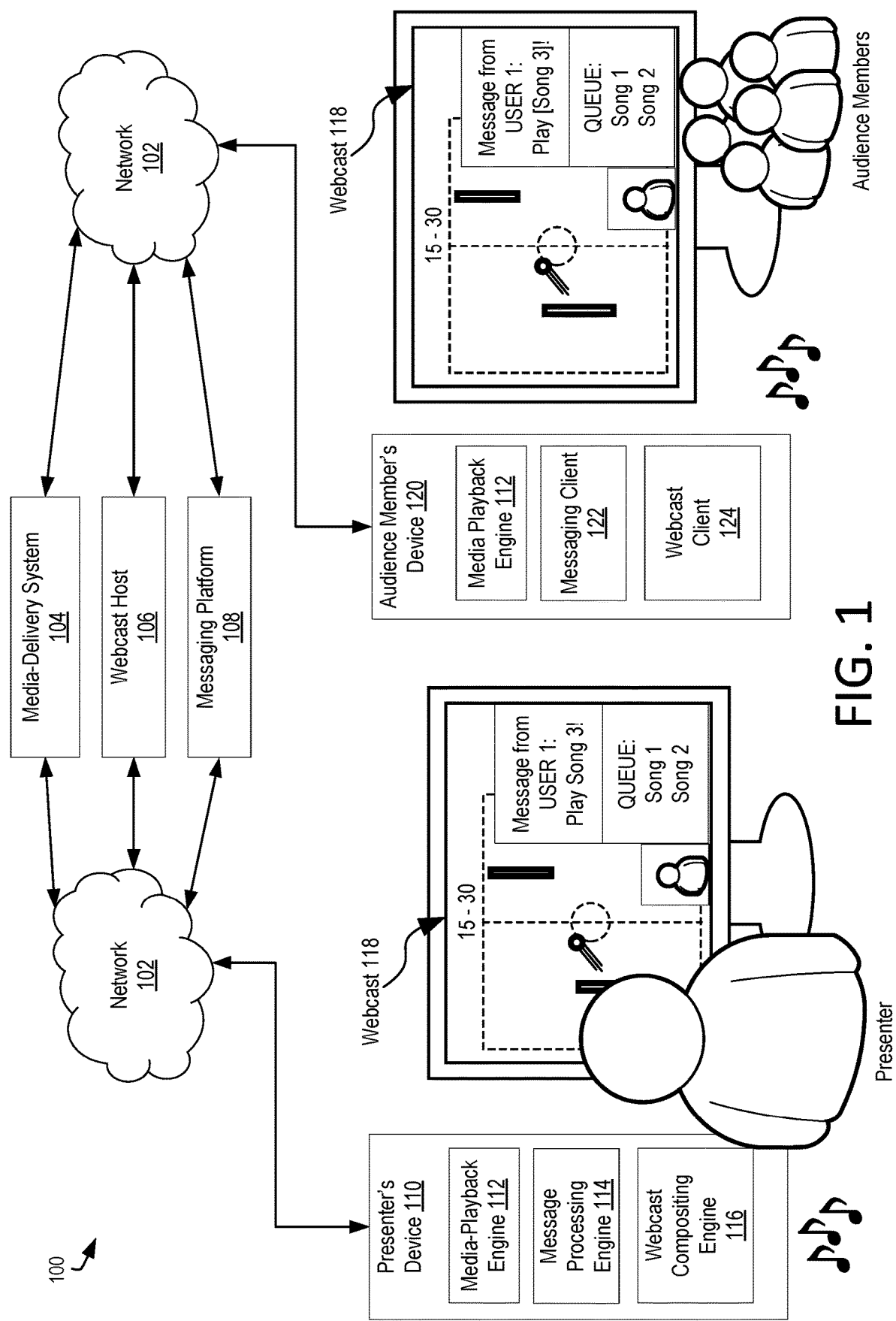
FIG. 1 illustrates an example system for distributed control of a media-playback component of a webcast.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

During webcasts, audience members can often interact with the presenter by sending the presenter messages. In some examples, the messages can include text, images, pictograms (e.g., emoji), audio, or video sent over a variety of messaging platforms, including but not limited to email platforms, instant messaging platforms, or social networking platforms. These messages can often include text content designed to be presented to the presenter, such as words of encouragement, questions to the presenter, or other content. In some examples, the messages contain links to certain content (e.g., video or audio content) hosted by a content provider (e.g., SPOTIFY or YOUTUBE). Sometimes the messages can include requests that the presenter play a particular song or other media content item.

During webcasts, presenters sometimes listen to music or play other media content. For example, the presenter may play background music while performing another activity, such as playing a video game. In another example, the media content item may be presented as foreground content (e.g., for commentary by the presenter or during a break from primary content).

Messages requesting that the presenter play particular media content items can take a variety of forms. In an example, the message may simply include the name of the media content item (e.g., "Play Free Bird"). In another example, the message may include a link to content hosted at a particular location (e.g., a link to a music file stored on a music streaming site or a link to a media content item on other sites).

To play linked media content items, the presenter may need to first notice the message. The presenter would then search for the requested media content item in a media library. Alternatively, where the message includes a link to a media content item, the presenter may need to access the link by, for example, clicking on the link or copying and pasting the link into a web browser or another program. Further, if the presenter is already playing a particular media content item, the presenter may need to pause the currently-playing item and switch to the requested item, so as not be playing multiple media content items at once.

This process can be very time and attention consuming for the presenter. If the presenter is currently engaged in another activity (e.g., playing a game or presenting information), the presenter would need to move attention away from that activity to notice the request and act on it by playing the media content item. This can result in a poor user experience because taking attention away from a presenter's primary activity can be distracting to both the presenter and the audience.

In addition, it can be difficult for the presenter to manage the playback of media content items. For example, audience members may send the presenter media content items from a variety of different sources (e.g., various streaming video or music providers). These sources may have different playback controls or other requirements for playback. In addition, there can be compatibility issues across different media services. For example, the audience member may send a link to a content item hosted by a particular content service from which the presenter cannot play (e.g., because the presenter does not have a subscription to that content service or that content service is not compatible with the presenter's device) or prefers not to play (e.g., because the service consumes a large amount of bandwidth).

Further, there are security concerns relating to the content of the messages. For example, where the request includes a link to content or an attachment, the presenter would need to access the content to fulfill the request. The presenter may not know whether the content presents a security risk or even if the content is what the requestor purports it to be. In an example, the message could contain a link that is ostensibly to a requested song, however the link may instead be to different content altogether. Such a link could be to content that is not suitable for the presenter's webcast (e.g., because it contains explicit, vulgar, or obscene content) or to malicious content (e.g., a virus or other malware). Further still, while some content hosts may exert editorial control over hosted content (e.g., filtering explicit content), the presenter may receive links to sites that are not so well controlled.

Additionally, a presenter can receive a large volume of messages from his or her audience. While the presenter may want to increase engagement with his or her audience members, it can be difficult for the presenter to respond to the volume of messages and other requests. For example, an audience member may send a request that the presenter play particular song, but this request can be overlooked within the volume of other messages that the presenter receives.

Further, audience members may be interested in learning more about a currently-playing media content item. For example, if an audience member is interested in learning what song the presenter is playing in the background, it can be difficult for the audience member to find out what that song is. The audience member could send a message asking the presenter or another audience member but may not receive a response. Even if the presenter or another audience member did respond, the exchange could be time and resource intensive.

Disclosed embodiments are relevant to overcoming one or more of these and other problems. For example, disclosed embodiments include systems and methods for distributed control of media-playback components of a webcast. Such embodiments can provide technical improvements, including but not limited to reducing the number of interactions required by the presenter to manage the playback of media content items and improving security for the presenter's device.

In an example, the presenter's device (e.g., a desktop computer, a laptop computer, or a mobile device) can include a webcast compositing engine for creating a webcast from a variety of data sources. The device can also include a media-playback engine that plays media content items (e.g., audio or video content items, such as songs or movies) and a message processing engine that processes messages sent from audience members to the presenter. The message processing engine can obtain the messages and parse the messages for tokens indicative of a requested media content item. The message processing engine, having identified the requested media content item, can then cause the media-playback engine to play the requested content or add it to a queue.

The message processing engine can parse messages to determine if a message contains requests relating to media-playback and cause the media-playback engine to take an action based thereon. For example, an audience member may request that a particular media content item be played, the current song be skipped, that a playlist be shuffled, that the playback volume be adjusted, that the genre of music be changed, that a different playlist be played, or other operations related to media-playback.

By performing these or other tasks, the message processing engine can be relevant to overcoming one or more challenges in providing media content items while webcasting. By automatically responding to user requests, the message processing engine can provide an improved user experience for the presenter and the audience members. In addition, the parsing of the request and sending the instructions to the media-playback engine, can reduce some security concerns related to clicking on links provided by audience members.

The media-playback engine can provide metadata regarding the currently playing song to the webcast compositing engine. This can allow the webcast to include information regarding currently-playing media content items, as well as media content items in a playback queue, among other information.

In addition to challenges regarding responding to requests from audience members, there can also be challenges relating to playing media content items during the webcast, which can raise user interface, quality, and licensing concerns.

There can be user interface challenges to the presenter managing media content item playback while concentrating on performing a primary webcast activity (e.g., playing a video game). As a feature relevant to addressing this challenge, the media-playback engine can provide a low-attention user interface to allow the presenter to manage media content item playback without consuming a significant amount of attention. In some examples, there may be hotkeys, keyboard shortcuts, voice commands, or minimalistic user interface elements provided by the media-playback engine to enable the presenter to manage playback (e.g., skip a track).

Regarding quality concerns, the presenter may want the audience to hear a playing media content item at a sufficiently high quality. In some examples, the presenter may play music through speakers, which is then recorded via a microphone (e.g., a same microphone that the presenter would use to record him or herself speaking). However, this can degrade the quality of music. Further, some presenters, may prefer to use headphones rather than speakers. In some examples, the presenter can pipe the output from the media-playback engine to the webcast compositing engine so the playing media content item gets mixed with the outgoing webcast. However, it can be technically difficult for the presenter to both play the music so her or she can listen to it and also mix it with the outgoing webcast. In addition, such a process can be computing-resource intensive.

Regarding licensing concerns, the presenter may not have a license or other permission to broadcast the media content item to the audience. However, audience members may still like to experience the same media content item as the presenter.

Some embodiments may provide synchronization data to media-playback engines on audience members' devices. For example, the media-playback engine on the presenter's device may provide synchronization data to audience members' devices. The synchronization data can include metadata regarding a currently-playing media content item and can be used to synchronize playback between the presenter's media-playback engine and the media-playback engines of the audience. Such a feature is relevant to overcoming one or more of challenges of a webcast host providing media content items to an audience.

In some examples, the synchronization data can correct for a delay between the presenter responding to the media content item in the webcast and the media-playback engine of the audience playing the same media content item. For example, it may not be advantageous to have the audience members and the presenter here the same music at the same time. This could cause playback issues where the audience member hears the music slightly before they see the presenter react to the music being played as a result of delays between the video feed leaving the presenter's device and the video feed arriving at an audience member's device. This can create a problem where an audience member hears an audio or visual cue of the media content item before the audience member sees the presenter react to it. In some examples, the synchronization data can include information to offset the playback of the media content item such that it is synchronized with the video feed being received by the audience member's device.

FIG. 1 illustrates an example system 100 for distributed control of a media-playback component of a webcast 118. The system 100 can include a network 102, a media-delivery system 104, a webcast host 106, a messaging platform 108, a presenter's device 110, and an audience member's device 120. A presenter can use the presenter's device 110 to provide the webcast 118 to the audience member's device 120.

The webcast 118 is a media presentation provided by a presenter for audience members over a network. The webcast 118 can use streaming technology over the Internet to provide the presentation to the audience members. The webcast 118 can provide video content, audio content, image content, and/or other content. The webcast 118 can include a variety of content, including news content, educational material, live performances (e.g., video game playing, music, comedy, etc.), interactive discussions, and other forms of content.

The network 102 is an electronic communication network that facilitates communication between two or more components of the system 100.

The media-delivery system 104 includes one or more computing devices and provides media content items to the presenter's device 110 and the audience member's device 120.

The webcast host 106 is a host of webcast data. For example, the presenter need not provide the webcast 118 directly from the presenter's device 110 to the audience member's device 120. Instead, the presenter may provide the webcast 118 from the presenter's device 110 to the webcast host 106. The webcast host 106 can thereby, provide bandwidth allocation distributed denial of service attack protection, webcast discoverability, community services, and other benefits in the webcasting process. Examples of webcast hosting services include but are not limited to TWITCH, YOUTUBE LIVE, FACEBOOK LIVE, and USTREAM. Audience members can connect to the webcast host 106 to receive the webcast 118 at the audience member's device 120.

The messaging platform 108 is a communication platform that facilitates communication from audience members to the presenter. The messaging platform 108 can provide communication via one or more communication formats, such as email, instant messaging, text messaging (e.g., SMS or MMS messages), or social media posts. In an example, the messaging platform 108 can include a web portal that enables audience members to specify to which presenter to send a message, enables audience members to compose a message, and further enables the audience member to send that message to the presenter. Examples of messaging platform services include but are not limited to STREAMLABS (e.g., TWITCHALERTS service), TWITTER, DISCORD, FACEBOOK, and INSTAGRAM. Webcast platforms can also provide a build-in messaging platforms that allow audience members to communicate to the presenter.

While the media-delivery system 104, the webcast host 106, and the messaging platform 108 are shown as separate components, they need not be. For example, a webcasting platform may provide both webcast host 106 and messaging platform 108 services. As another example, a single service can provide the media-delivery system 104, the webcast host 106, and the messaging platform 108.

The presenter's device 110 is a device (e.g., a desktop computer, a laptop computer, a smart phone, a tablet, or another device) used by the presenter to provide one or more components of the webcast 118. The presenter's device 110 can include a media-playback engine 112, a message processing engine 114, and a webcast compositing engine 116.

The media-playback engine 112 selects and plays back media content generates interfaces for selecting and playing media content items. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof. The presenter can use the media-playback engine 112 to play media content items, such as songs, during the webcast 118.

The message processing engine 114 processes messages sent from audience members to the presenter. For example, the message processing engine 114 can parse the messages from audience members for particular content and take an action in response. For example, the audience member's message may include a request to play a song, and the message processing engine 114 can identify the request and cause the media-playback engine 112 to take an action based on the request.

Although the media-playback engine 112, the message processing engine 114, and the webcast compositing engine 116 are shown as being part of the same device, they need not be. For example, the presenter may use multiple devices to provide the webcast 118. For instance, the presenter may use a separate device to control the media-playback engine or respond to messages.

While the message processing engine 114 is shown as being a part of the presenter's device 110, it need not be. Some or all of the components or functions of the message processing engine 114 can be located elsewhere, such as at a remote device (e.g., the messaging platform 108). In another example, the message processing engine can be a part of the media-playback engine 112 (e.g. as a plug-in). In another example, some or all of the components or functions of the webcast compositing engine 116 can be located elsewhere, such as at a remote location (e.g., as part of the webcast host 106).

The webcast compositing engine 116 can be used to prepare the webcast 118. For example, the webcast compositing engine 116 can receive input data and combine that input data to produce the webcast 118 as output (see, e.g., FIG. 5 and associated disclosure). The webcast 118 can then be provided from the webcast compositing engine 116 to the webcast host 106. Audience members can then receive the webcast 118 by connecting to the webcast host 106.

The audience member's device 120 is a device (e.g., a desktop computer, a laptop computer, a smart phone, a tablet, or another device) used by an audience member to receive the webcast 118. In an example, the audience member's device 120 can include a media-playback engine 112, a messaging client 122, and a webcast client 124.

The media-playback engine 112 can be a media-playback engine similar to the media-playback engine 112 on the presenter's device 110. The media-playback engine 112 can enable the audience member to play media content.

The messaging client 122 came be a client used by the audience members to compose and send messages, such as messages to the presenter's device 110 using the messaging platform 108.

The webcast client 124 can be a client used by the audience member to receive the webcast 118.

While the media-playback engine 112, the messaging client 122, and the webcast client 124 are shown as separate aspects of the audience member's device 120, they need not be. An example, the components may be spread across a variety of different devices, for example the audience member may be watching the webcast 118 on a television while using a messaging client 122 on a smartphone to message the presenter. In another example, the messaging client may be a component of the webcast client 124.

Figure 2:
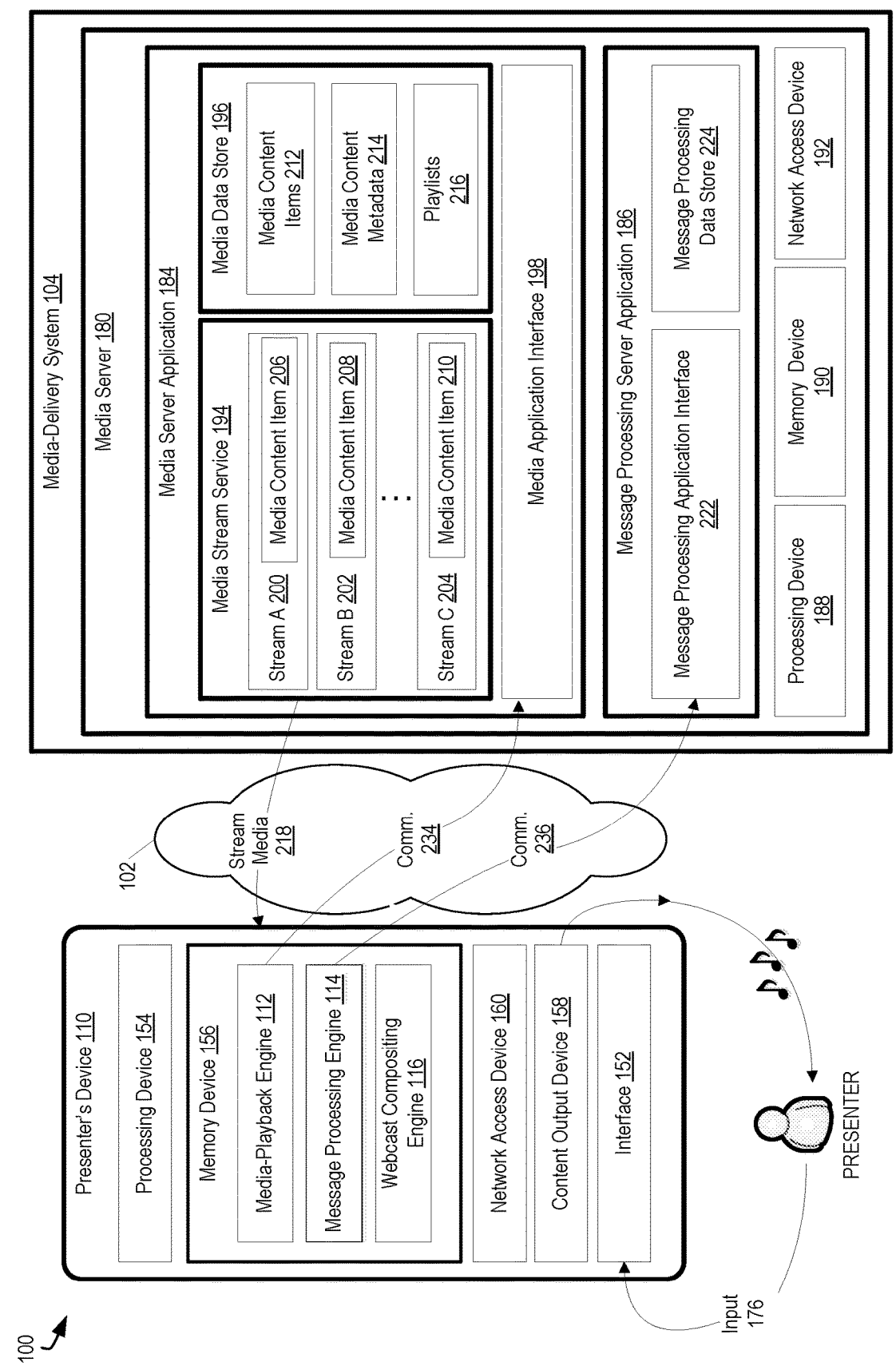
FIG. 2 illustrates an example aspect of the system relating to a presenter's device and a media-delivery system.

FIG. 2 illustrates an example aspect of the system 100 relating to the network 102, the presenter's device 110, and a media-delivery system 104.

The network 102 is an electronic communication network that facilitates communication between components of the system 100. An electronic communication network includes a set of computing devices and links between the computing devices. The computing devices in the network use the links to enable communication among the computing devices in the network. The network 102 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 102 includes various types of links. For example, the network 102 can include wired and/or wireless links, including Bluetooth®, ultra-wideband (UWB), 802.11, ZigBee®, cellular, and other types of wireless links. Furthermore, in various embodiments, the network 102 is implemented at various scales. For example, the network 102 can be implemented as one or more local area networks (LANs), metropolitan area networks, subnets, wide area networks (such as the Internet), or can be implemented at another scale. Further, in some embodiments, the network 102 includes multiple networks, which may be of the same type or of multiple different types.

As noted above, the presenter's device 110 can play media content items. In some embodiments, the presenter's device 110 plays media content items that are provided (e.g., streamed, transmitted, etc.) by a system external to the media-playback device such as the media-delivery system 104, another system, or a peer device. Alternatively, in some embodiments, the presenter's device 110 plays media content items stored locally on the presenter's device 110. Further, in at least some embodiments, the presenter's device 110 plays media content items that are stored locally as well as media content items provided by other systems.

In some embodiments, the presenter's device 110 is a computing device, handheld entertainment device, smartphone, tablet, watch, wearable device, or any other type of device capable of playing media content. In yet other embodiments, the presenter's device 110 is or includes a laptop computer, desktop computer, television, gaming console, set-top box, network appliance, optical media player, media player, stereo system, smart speaker, Internet-of-things device, or radio.

In at least some embodiments, the presenter's device 110 includes, an interface 152, a processing device 154, a memory device 156, a content output device 158, and a network access device 162, among other components. Other embodiments may include additional, different, or fewer components. For example, some embodiments do not include one or more of the location-determining device 150, the interface 152, the sound-sensing device 164, and the optical-sensing device 166.

The interface 152 is the one or more components of the presenter's device 110 over which the presenter and the presenter's device 110 can interact unidirectionally or bidirectionally. The interface 152 can include, for example a touch screen that can display data to the user and receive input 176 from a selector (e.g., a finger, stylus, etc.) controlled by the user. The interface 152 can include, for example, a display device, a mouse, a keyboard, a webcam, a microphone, speakers, a headphone, haptic feedback devices, or other components.

In an example, the processing device 154 includes one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions and data for the media-playback engine 112, the message processing engine 114, and the webcast compositing engine 116.

The memory device 156 typically includes at least some form of computer-readable media. Computer-readable media includes any available media that can be accessed by the presenter's device. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, optical storage, magnetic cassettes, magnetic tape, magnetic disk storage or other magnetic storage devices, or any other medium that can be used to store the desired information and that can be accessed by the presenter's device 110. In some embodiments, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The content output device 158 operates to output media content. In some embodiments, the content output device 158 generates media output for the user. Examples of the content output device 158 include a speaker assembly comprising one or more speakers, an audio output jack, a Bluetooth® transmitter, a display panel, and a video output jack. Other embodiments are possible as well. For example, the content output device 158 may transmit a signal through the audio output jack or BLUETOOTH transmitter that can be used to reproduce an audio signal by a connected or paired device such as headphones or a speaker system. The content output device 158 can also make available the content on the presenter's device 110. For example, the content can be provided to a process running on the presenter's device 110, such as the webcast compositing engine 116.

The media-delivery system 104 includes one or more computing devices and provides media content items to the presenter's device 110 and, in some embodiments, other devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the presenter's device 110. In some embodiments, the media server 180 includes a media server application 184, a message processing server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems to retrieve media content items from the media server 180. For example, in FIG. 2, the media application interface 198 receives communication 234 from the media-playback engine 112.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, and other information. The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The message processing server application 186 provides message-processing-specific functionality. In some embodiments, the message processing server application 186 includes a message processing application interface 222 and a message processing data store 224.

In some examples, the message processing server application 186 can provide some or all of the functionality of the message processing engine 114. In some examples, the message processing server application 186 can obtain message, parse the messages, and cause the media server 180 and/or the media-playback engine 112 to take an action based on the parsed message. In some examples, the message processing server application 186 obtains the message and sends the message to the message processing engine 114 for processing.

In some examples, the message processing server application 186 receives a message or portion thereof from the message processing engine 114 and performs processing. For instance, the message processing server application 186 can receive an actual or suspected media content item identifier from the message processing engine 114, query the media server application 184 to determine whether the media stream service 194 can provide a media content item associated with the identifier, and take an action thereon (e.g., inform the message processing engine 114 whether a media content item associated with the identifier can be played or cause the media server 180 to provide the media content item associated with the identifier to the presenter's device 110). In some examples, the message processing server application 186 performs processing or other resource intensive activities, such as machine learning processing on messages.

Additionally, the message processing server application 186 can process data and user input information received from the presenter's device 110. In some embodiments, message processing server application 186 operates to transmit information about messages. For example, the message processing server application 186 may store metadata and other information about messages. The message processing data store 224 may store information relating to messages or message processing. The information can include, for example, a list of permitted senders, a list of blocked message senders, frequent requests, valid requests, request patterns (e.g., that a phrase including the word "play" followed by the name of a song indicates that the user wants to play a the named song), and other information.

Each of the presenter's device 110 and the media-delivery system 104 can include additional physical computer or hardware resources. In at least some embodiments, the presenter's device 110 communicates with the media-delivery system 104 via the network 102.

Although in FIG. 2 only a single presenter's device 110 and media-delivery system 104 are shown, in accordance with some embodiments, the media-delivery system 104 can support the simultaneous use of multiple devices, and the devices can simultaneously access media content from multiple media-delivery systems.

Additionally, although FIG. 2 illustrates a streaming media based system for media-playback, other embodiments are possible as well. For example, in some embodiments, the presenter's device 110 includes a media data store and the presenter's device is configured to select and playback media content items without accessing the media-delivery system 104. Further in some embodiments, the presenter's device 110 operates to store previously-streamed media content items in a local media data store.

In at least some embodiments, the media-delivery system 104 can be used to stream, progressively download, or otherwise communicate music, other audio, video, or other forms of media content items to the presenter's device 110 for playback on the presenter's device 110. In accordance with an embodiment, the presenter can direct the input 176 to the user interface 168 to issue requests, for example, to select media content for playback on the presenter's device 110. Downloaded or cached media content items can be played (as opposed to streamed from media server 180) during webcasting to alleviate bandwidth usage concerns.

Figure 3:
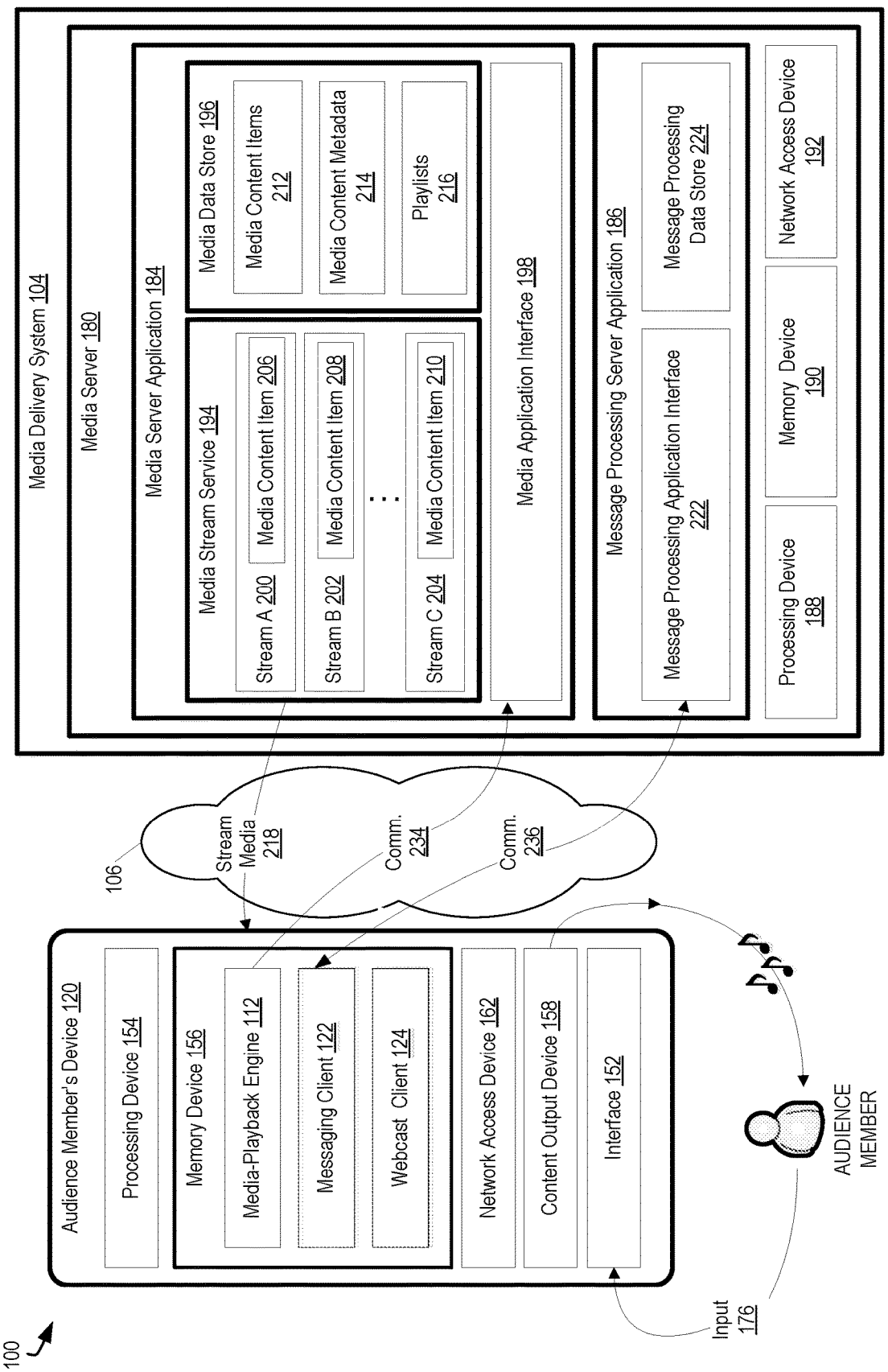
FIG. 3 illustrates an example aspect of the system relating to an audience member's device and the media-delivery system.

FIG. 3 illustrates an example aspect of the system 100 relating to the network 102, the audience member's device 120, and the media-delivery system 104. The components of the media-delivery system 104 and the audience member's device 120 may behave analogously to their counterparts shown and described in relation to FIG. 2.

The memory device 156 of the audience member's device may include a media-playback engine 112 (e.g., having the same or similar features to the media-playback engine 112 of the presenter's device 110), a messaging client 122, and a webcast client 124.

The messaging client 122 came be a client used by the audience members to send messages, such as messages to the presenter's device 110 using the messaging platform 108. For example, the messaging client can include an instant messaging client or an email client. In another example, the messaging client 122 can be a web browser usable by the audience member to access a web page associated with the messaging platform 108 that is usable to send a message.

In some examples, the messaging client 122 communicates with the message processing server application 186, which can act as the messaging platform 108. For example, the audience member can use the messaging client 122 to compose a message and send the message to the message processing server application 186. The message processing server application 186 can then send the message to the presenter's device 110.

The webcast client 124 can be a client used by the audience member to receive the webcast 118. For example, the webcast client 124 can access the webcast host 106 to receive the webcast 118. The webcast client 124 can be a web browser that the audience member can use to access a web page that provides the webcast 118. In another example, the webcast client 124 can be a desktop or mobile application providing access to webcasts hosted by the webcast host 106.

In some examples, the media server 180 may act as the webcast host 106. In such examples, webcast client 124 may receive the webcast 118 from the media server 180.

Figure 4:
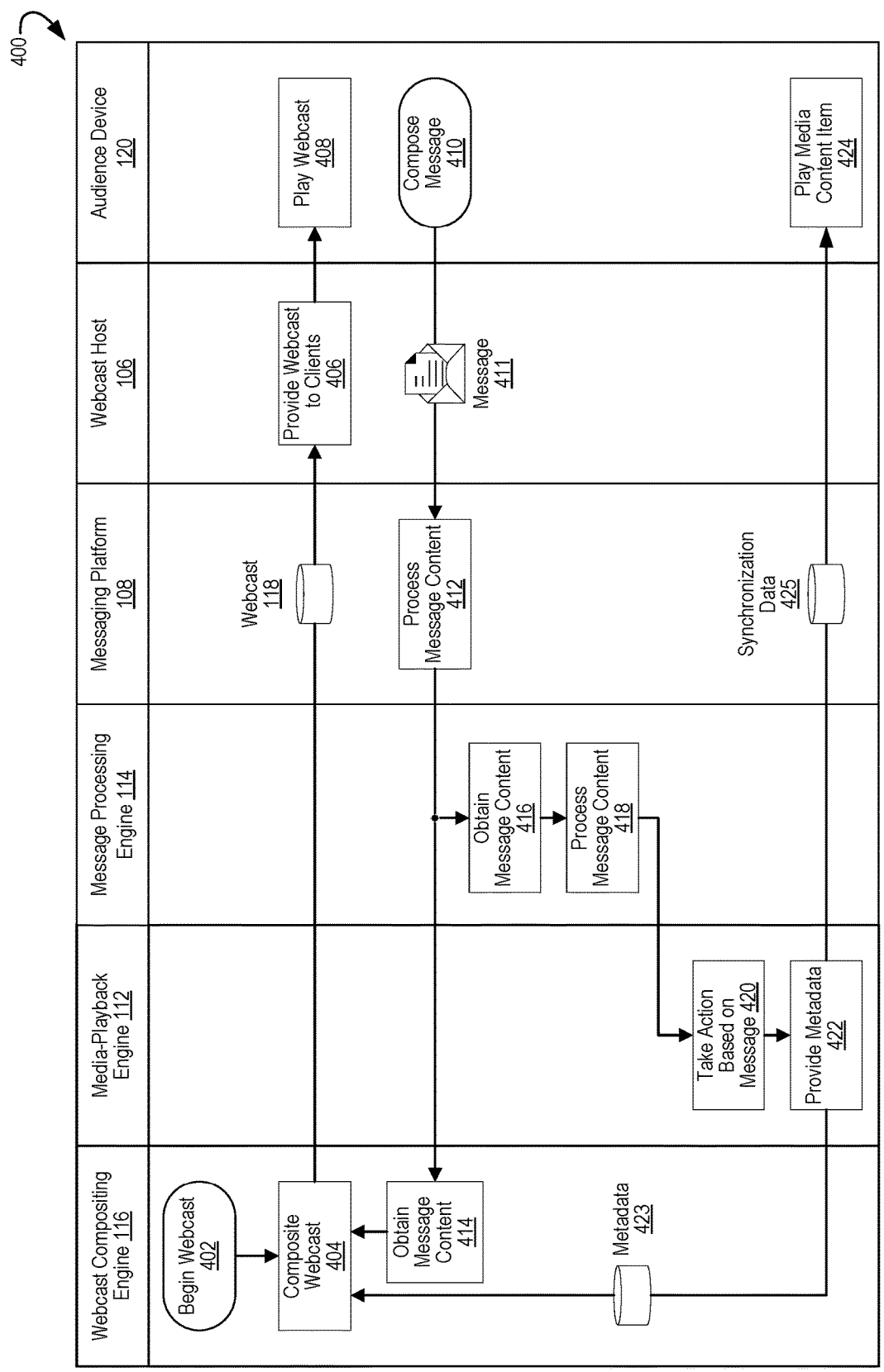
FIG. 4 illustrates an example process for distributed control of media-playback component of webcast.

FIG. 4 illustrates an example process 400 for distributed control of a media-playback component of a webcast.

The process 400 can begin with operation 402, which recites "begin webcast". Operation 402 can be followed by operation 404, which recites "composite webcast". Operation 404 can result in the creation of webcast 118. Operation 404 can be followed by operation 406, which recites "provide webcast to clients". Operation 406 can be followed by operation 408, which recites "play webcast".

The process 400 can include a new flow that beings at operation 410, which recites "compose message". Operation 410 can result in the creation of a message 411. Operation 410 can be followed by operation 412, which recites "process message content". Operation 412 can be followed by both operation 414, which recites "obtain message content", and operation 416, which recites "obtain message content". Operation 416 can be followed by operation 418, which recites "process messaging content". Operation 418 can be following operation 420, which recites "play media content item". Operation 420 can be following operation 422, which recites provide metadata". Operation 422 can provide metadata 423 and synchronization data 425. Operation 422 can be followed by operation 424, which recites "play media content item".

Operation 402, which recites "begin webcast", can include, for example, the presenter beginning a webcast 118. This can include, for example, the presenter launching the webcast compositing engine 116, the presenter preparing the content to be provided through the webcast 118 (e.g., a game), connecting the webcast compositing engine 116 to the webcast host 106, or other actions. Operation 404 may follow operation 402.

During this operation 404, which recites "composite webcast", the webcast compositing engine 116 can obtain input data and composite the input data together to create a webcast 118. For example, the webcast compositing engine can obtain a feed of the presenter's screen, which can show a current game that the presenter is playing. The webcast compositing engine 116 can then combine this feed with, for example, data from a camera (e.g., a webcam), data from the media-playback engine 112 (e.g. metadata regarding currently playing music or the actual music itself), messaging data, and other data. The combined data can then be provided as a webcast 118 to the webcast host 106 for distribution to the audience member's device 120. More information regarding operation 404 is shown and described in relation to FIG. 5.

Figure 5:
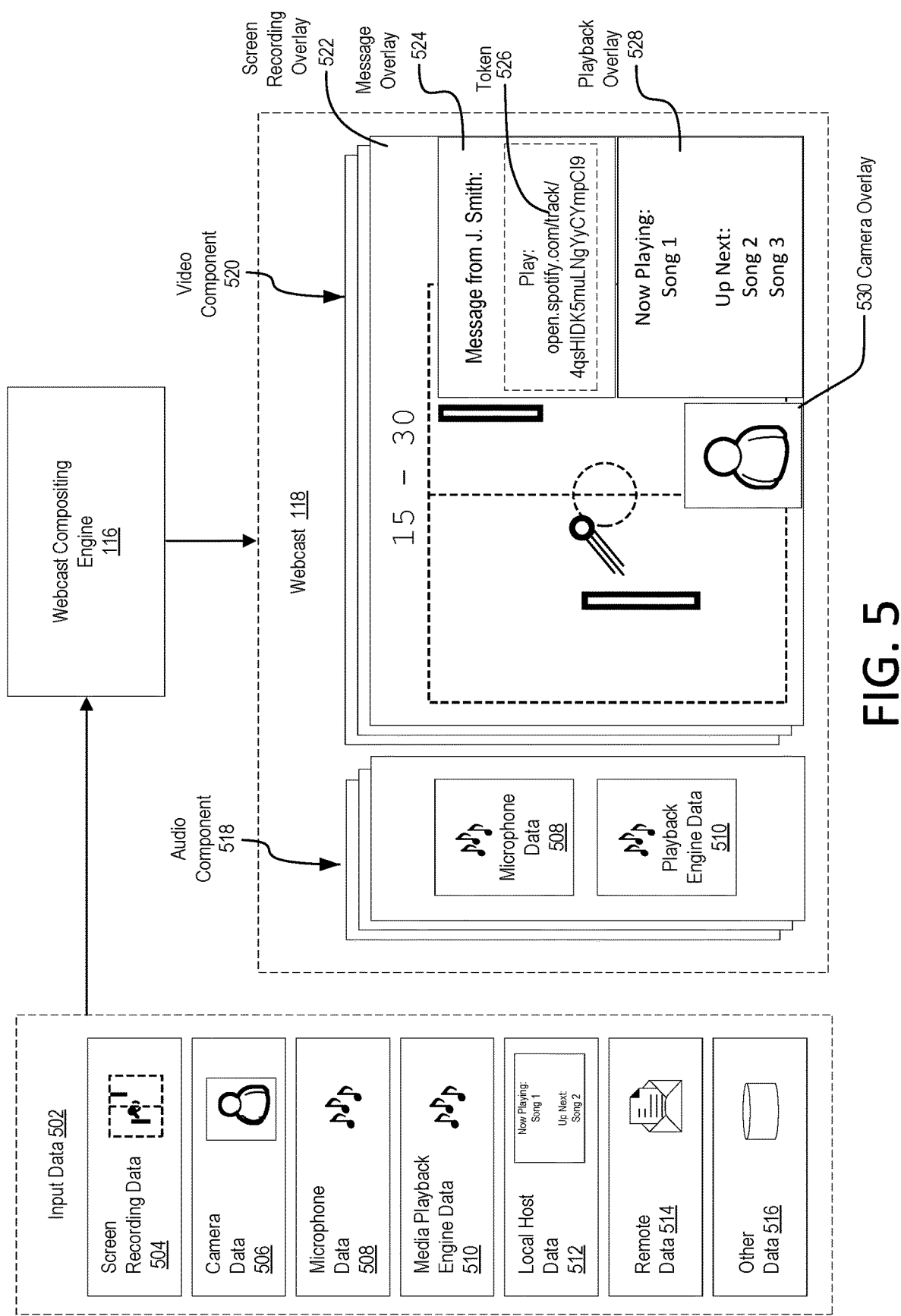
FIG. 5 illustrates example streaming content created from input data using a webcast compositing engine.

FIG. 5 illustrates an example webcast 118 created from input data 502 using the webcast compositing engine 116. The input data 502 can include a variety of data that the webcast compositing engine 116 can receive and use to create a webcast 118. The input data 502 can include screen recording data 504, camera data 506, microphone data 508, media-playback engine data 510, localhost data 512, remote data 514, and other data 516.

The screen recording data 504 can include data obtained from screen recording software running on the presenter's device 110. The screen recording software can capture some or all of the content of the presenter's screen. In an example, the screen capture software can run on the presenter's device 110 and captures information displayed on the screen of the presenter's device 110. The screen recording data 504 can typically include visual data and may also include audio data, such as audio output data produced by the presenter's device 110.

In another example, the screen capture software can obtain data from another screen. For example, the presenter may be playing a game on a video-game console that does not support screen capture software running directly on the console. Instead, the presenter can connect a video capture device to the console or other screen to record the content displayed on the screen.

Camera data 506 can include video or still image data received from a camera. For example, the presenter may use a webcam to record himself or herself while playing a game or doing another activity. In another example, the presenter may use a camera to record some other activity. In some examples, the camera data 506 can include audio data, such as from a built-in microphone of a camera.

Microphone data 508 can include audio data received from a microphone. For example, it can include data received from a microphone integrated with a camera (e.g. the camera used to record the camera data 506), a standalone microphone, a combination thereof, or another microphone. In some examples, the camera data 506 and the microphone data 508 can be received together from a same source, such as in a video stream from a camera.

The media-playback engine data 510 can include data regarding the media-playback engine 112. The media-playback engine data 510 can include, for example, actual media-playback output (e.g. audio output, video output, or image output) from the media-playback engine 112 playing a media content item. The media-playback engine data 510 can also include metadata, such as metadata regarding currently-playing media (e.g., media content item playback position, requestor, length, title, artist, genre, album, or other data) or content media upcoming media (e.g., position in playback queue, position in playlist, requestor, or other data). In an example, a media-playback engine 112 can include a visualizer that generates a visual display based on currently playing audio. The visual display can be included in the media-playback engine data 510.

The localhost data 512 can include data retrieved from a local host (e.g., the computer on which the webcast compositing engine 116 is being run), which is commonly represented with the IPv4 address 127.0.0.1 or the IPv6 address ::1:. One or more local programs can use the localhost to host data. For example, the presenter's device 110 can host a webpage at the localhost. The webcast compositing engine 116 can retrieve data hosted by the localhost (e.g., retrieve data from the webpage hosted at the localhost) and composite it into the webcast 118. For example, a media-playback engine 112 may make data available at a webpage hosted by the localhost. This data can include, for example, metadata regarding currently playing or soon to be playing media content items.

Remote data 514 can include data obtained from a source external to the device on which the webcast compositing engine 116 is running. For example, the remote data 514 can include messages received from the messaging platform 108. The remote data 514 can also include data obtained from a remote server, a remote sensor, an Internet-of-things device, a computer on a local network to the presenter's device 110, or another device. For instance, the remote data 514 can include weather data, stock data, fitness tracker data, and other information.

The input data 502 can also include other data 516. Other data 516 can include, for example, data from input logging software (e.g., so that audience members can see what keys the presenter is hitting on his or her computer), data from sensors on the presenter's device 110 (e.g. accelerometer data, location data, and other data). Other data 516 can also include, for example, presenter preferences regarding the webcast 118. For instance, data regarding a webcast quality and other data may be saved locally and loaded as part of the webcast compositing engine 116 compositing process. The other data 516 can include a template or layout for arranging the visual components of the webcast 118. The other data 516 can also include data regarding the presenter's audience, such as a number of audience members watching the stream, a ranking of audience members based on a criteria (e.g., top requestors of media content items), data regarding previously-played media content items (e.g., a list of most-requested media content items) and other data.

The webcast compositing engine 116 can obtain the input data 502 and composite some or all of the input data 502 together to form the webcast 118. This process can include, for example, mixing together one or more audio and or video data sources to form the webcast 118. In some examples, the presenter can arrange how various video, image, or other visual data will be displayed in the webcast 118.

The webcast 118 can include both an audio component 518 and a video component 520. The audio component 518 can include audio from the input data 502, such as the microphone data 508 and the playback engine data 510. The audio can be mixed together at different volumes. The audio can be mixed such that particular components are panned in a particular direction (e.g., to a left or right audio channel). In some examples, corrections can be applied to the audio, such as noise correction, normalization, or other corrections.

In some examples, the video component 520 can include a screen recording overlay 522 based on, for example, the screen recording data 504. The screen recording overlay 522 can be a main focus of the webcast 118 and be given a prominent emphasis within the webcast 118. For example, the screen recording overlay 522 can take up the entire display of the webcast 118, with other content displayed on top of screen recording overlay 522. In other examples, the webcast 118 can include a reduced-size screen recording overlay 522 so the displayed data is not obscured by other overlays.

The webcast 118 can also include a message overlay 524. The message overlay 524 can be configured to display messages, such as those received from audience members (e.g., as part of the remote data 514). For example, when a message is received it can be automatically displayed as part of the overlay 524. The message overlay 524 can be a text box that displays the message data, such as information about the author of the message the content of the message, and other information.

In some examples, a message of the message overlay 524 can include a token 526. The token 526 can be data within the message that the message processing engine 114 can detect and take an action based on. For example, the illustrated message includes a request from a user to play a particular track. In this instance, the particular track as identified by a URL to a track and the URL can be considered a token 526. In other examples, the token can be a request to take a particular action with regard to media playback. For example, the message from the user may indicate that the user wants a particular action to be taken, such as skip to a next track, shuffle the playlist, adjust volume, or take another action. These action requests can be considered a token 526 within the message. Examples of messages and tokens are shown and described in relation to FIG. 6.

The webcast 118 can also include a playback overlay 528. The playback overlay 528 can include data associated with the media-playback engine 112, such as data from the media-playback engine data 510. For example, as illustrated, the playback overlay 528 can include information regarding a currently-playing media content item (e.g. the title, artist, playback position, album art, and genre) as well as media content items within a playback queue (e.g. what songs are coming up next). In some examples, the playback overlay 528 can also include visualizer data associated with the currently playing media content item.

The webcast 118 can also include a camera overlay 530. The camera overlay 530 can show data retrieved from a camera used by the presenter (e.g., a webcam of the presenter). The camera overlay 530 can include data from camera data 506).

The webcast 118 can further include various effects or other modifications, such as animations that appear when a new messages received, when a song changes, or upon detection of another event.

Returning to FIG. 4, operation 404 can result in the creation of the webcast 118. The presenter's device 110 can stream the webcast 118 to the webcast host 106 over the network 102. For example, the webcast compositing engine 116 can direct a video output stream to the webcast host 106. This can include configuring a variety of settings, including an identifier of the webcast host 106 (e.g., an IP address of a server associated with the webcast host 106), providing a streaming key, network quality settings, video encoding settings, and other settings. Operation 404 can be followed by operation 406.

Operation 406, which recites "provide webcast to clients", can include the webcast host 106 making the webcast 118 available to audience members. For example, the webcast host 106 can publish the webcast 118 to a location accessible over the Internet such that an audience member can use the webcast client 124 to connect to the webcast host 106 to receive the webcast 118. Operation 408 can follow operation 406.

At operation 408, which recites "play webcast", the audience member's device 120 can play content provided by the webcast host 106. For example, the webcast client 124 can connect to the webcast host 106, receive the webcast 118, and play the webcast 118 using the audience member's device 120.

While watching the webcast 118, the audience member may want to send a message to the presenter. To do so, the audience member can compose a message at operation 410.

At operation 410, which recites "compose message", the audience member can prepare a message 411 to send to the presenter. For example, the audience member can compose the message 411 using the messaging client 122. This can involve, for example, launching a messaging client application, navigating a web browser to a messaging client website, accessing a messaging client portion of the webcast client 124, or taking another action.

In some examples, the message 411 can be composed with a request that a particular action be taken regarding media playback. For example, the audience member may request that the presenter play a particular media content item, such as a song. Examples of messages and requests are shown and described with regard to FIG. 6.

In some examples, the messaging client 122 may help the audience member create the message 411 with a token that is readily understood by the message processing engine 114. The token can, for example, be associated with media content items that are able to be played by the media-playback engine 112 of the presenter's device 110. In another example, the token can be associated with a particular action that is able to be taken by the media-playback engine 112 of the presenter's device 110.

The messaging client 122 can present a user interface that the audience member can use to select particular media content items or commands to send with the message 411. The messaging client 122 can then format the message 411 with a token associated with the selected media content item or command in a manner that is readily understood by the media-playback engine 112 or the message processing engine 114, such as using particular tags or formatting.

In some examples, the messaging client 122 may obtain a list of media content items that are able to be played by the media-playback engine 112 of the presenter's device 110. This can include media content items that can be played over the webcast 118 to the audience (e.g., because the presenter has a license or other permission to play the media content item in a webcast). In some examples, the presenter may set preferences that prevent particular media content items from being played. This can include media content items of a particular format (e.g., audio, video, etc.), media content items having a particular maturity level (e.g., media content items having an explicit rating, media content items containing profanity or obscenity, or media content items containing particular words, phrases, or images), media content items in a particular list (e.g., a list of media content items permitted to be played or a list of media content items that are banned or otherwise prevented from being played). In some examples, the presenter may set preferences that prevent particular commands from being performed, such as skipping a media content item or shuffling media content items.

The author may send the composed message 411. As part of this process, the messaging client 122 may format and send the message 411 to the messaging platform 108.

At operation 412, which recites "process message content", the messaging platform 108 can process the received message 411. For example, the messaging platform 108 can process the message 411 to determine a destination for the message 411 (e.g., the IP address of the presenter's device 110). In some examples, the messaging platform 108 may serve as a publishing endpoint that posts messages in a location viewable to all participants in the webcast 118, including the presenter and audience members. In some examples, the messaging platform 108 may provide private messaging services.

In some examples, the messaging platform 108 may filter the message 411 or its content. For example, the messaging platform 108 may prevent the transmission of messages from some users on a ban list, or may filter out particular kinds of content (e.g., profanity or spam). In some examples, the messaging platform 108 may apply weights to incoming messages. A particular presenter may receive a high volume of messages and it may be advantageous to apply a weight to messages or otherwise prioritize the messages.

The weight of a particular message may also affect, for example, whether and how the media-playback engine 112, the message processing engine 114, or the webcast compositing engine 116 respond to the message 411. The weight of the message 411 may also affect how the message 411 is displayed to the presenter, if at all.

For example, the weight of a particular message 411 may affect whether or how the media-playback engine 112 takes an action based on the message 411. For example, a high-weight message 411 requesting a song may be acted on sooner than a low-weight message 411. In some examples, different commands or requests can be associated with different weight levels. For example, the media-playback engine 112 may fulfill request to play or queue particular songs regardless of weight, but there may be a threshold weight requirement for fulfilling requests that the media-playback engine 112 take another kind of action, such as skipping to the next media content item.

In an example, the message processing engine 114 can give preferential treatment to messages having high weights. For example, messages having a weight lower than a threshold may be ignored or requests associated with messages having a higher weight may be addressed before requests associated with messages having a lower weight.

The weight of a particular message can affect whether and how the webcast compositing engine 116 provides the message as part of the webcast 118. The weight can affect whether and how prominently the message is displayed in the webcast 118. A high-weight message may be displayed in a larger font and with eye-catching effects, while a low-weight message may be displayed with little emphasis, if emphasized at all.

Messages can be given a weight based on a variety of factors such as, a number of times the message or a similar message has been sent. For example, if ten different users all request a particular song, then messages requesting that songs can have an increased weight until the song is eventually played because of the corresponding increase in interest in the particular song being played.

In some examples, the message 411 may contain or otherwise be associated with a donation and the messaging platform 108 or another platform may process the donation. The donations may be processed through a variety of different platforms including mobile payment platforms (e.g., ALIPAY, SWISH, VENMO, IMESSAGE payments, etc.), carrier billing, online payment platforms (e.g., PAYPAL, GOOGLE WALLET, etc.), subscription services (e.g., PATREON), among others. In an example, the audience member may want to send a donation to the presenter or an organization associated with the presenter. The messaging platform 108 can process the donation and provide payment platform services. In some examples, a donation amount can be correlated to a weight of a message 411. For example, messages containing a donation can be given a relatively higher weight than messages that do not. Messages containing relatively higher donations may be given a weight relatively higher than messages containing relatively lower donations.

In another example, weights may be associated with an activity or participation level of members in a presenter's community (e.g., members who frequently contribute messages, members who frequently watch the presenter's content, members who frequently donate to the presenter, members who have been a part of the presenter's community for a particular amount of time, etc.). In another example, presenters may assign weights to particular members, for example, the presenter may make particular members administrators or influencers, and their messages may automatically receive a particular weight.

In some examples, weights can also be associated with media content items or actions. For example, the message 411 may have a weight of five and request that a song be played. The requested song may be given the weight of five because that is the weight of the message that requested it. The song may be placed in a queue or playlist and the weight may continue to be associated with the song. The media playback engine 112 may select queued songs to play back based on their weight. For example, the playback queue may be arranged in descending order of weight. In some examples, the weight can be additive. For instance, if multiple, identical songs appear in a playback queue, they can be combined into a single entry in the queue having a combined weight.

After the messaging platform 108 processes the message 411, the message 411, a modification thereof, or data associated with the message 411 may be provided to, made available to, or otherwise obtained by the webcast compositing engine 116 at operation 414 and/or by the message processing engine 114 at operation 416.

At operation 414, which recites "obtain message content", the webcast compositing engine 116 can obtain message content, such as the message 411 or data associated with the message 411 from the messaging platform 108. The webcast compositing engine 116 can connect to a stream of data (e.g., messaging data) from the messaging platform. For example, the webcast compositing engine 116 may have a connection with the messaging platform 108, such that the messaging platform 108 can push message content to the webcast compositing engine 116. In another example, the webcast compositing engine 116 periodically polls the messaging platform 108 to determine if there is new message content associated with the presenter, and if so, obtains the message content. In another example, the messaging platform 108 makes messages available at a particular location, such a website or web service. The messaging platform 108 can then obtain the message content from the location.

Once obtained by the webcast compositing engine 116, the message content can be composited with other input data to create the webcast 118. Messages from audience members can be displayed as part of an overlay in the webcast 118 (e.g., as part of message overlay 524). In a particular example, when a new message is obtained, message data can be displayed in the webcast 118, including the author of the message, as well as the subject and/or body of the message.

At operation 416, which recites "obtain message content", the message processing engine 114 can obtain message content. In some examples, the message processing engine 114 can obtain message content in the same or a similar way to the webcast compositing engine 116.

In another example, the message processing engine 114 may not have a direct connection with the messaging platform 108 (e.g., the messaging platform 108 may not provide an application programming interface accessible by the message processing engine 114 over which to obtain the message content). In such instances, the message processing engine 114 can intercept messages between the messaging platform 108 and the webcast compositing engine 116 (e.g., by performing analysis on packets or other data associated with the stream of data from the messaging platform 108). In another example, the message processing engine 114 can include a screen reader that reads messages displayed in the webcast 118 (e.g., obtained at operation 414 and composited into the webcast 118 at operation 404). In another example, the webcast compositing engine 116 can provide the message content to the message processing engine 114.

At operation 418, which recites "process message content", the message processing engine 114 can parse, analyze, or otherwise process the content within the message 411. For example, the message processing engine 114 can parse the message content to determine whether it contains a token associated with a media content item or a command related to media-playback. Determining whether the message content contains a token can involve, for example, using natural language processing, regular expressions, machine learning, or other techniques.

When analyzing the message, the message processing engine 114 may determine a confidence level for whether the message includes a token. The message processing engine 114 may determine a confidence level that the token includes a specific action (e.g., play a particular media content item) and a confidence level whether a particular target or subject of that action is a media content item playable by the media-playback engine. If confidence values are above a threshold, then the message processing engine 114 can instruct the media-playback engine 112 to play a particular media content item. If either confidence value is below a threshold, then the message processing engine 114 can ignore the message. For example, the message may recite "play the action game playlist". The message processing engine can parse the message and identify with high confidence that the word "play" requests a particular action and that the target of that action is "the action game playlist". The message processing engine 114 may further determine whether that target is playable by the media-playback engine. This can involve determining whether there is a playlist playable by the media-playback engine 112 that is entitled "action game playlist" or simply "action game". If so, then the message processing engine 114 may have high confidence that it is playable and the message processing engine 114 may take an action (e.g., instructing the media-playback engine 112 to play the playlist). If the playlist is not found or is otherwise not playable, then the message processing engine 114 may have a low confidence and may ignore the message. In some examples, the message processing engine 114 may inform the presenter or the author of the message that the request could not be fulfilled. For example, if the message processing engine 114 had a confidence above a threshold that the message requested an action but there was a low confidence that the specific action (e.g., play a particular song) could not be performed, then the message processing engine 114 may inform the audience member that the request could not be fulfilled (e.g., the particular song is unavailable to be played).

In an example, the message processing engine 114 can search the message (e.g., using regular expressions) for tags identifying particular media content items. For example, the message may be formatted using Extensible Markup Language (XML) as the following:

```
<?xml version="1.0" encoding="UTF-8"?>
<Message>
    <Author>J. Doe </Author>
    <Body> Please play this song:
        <Song>Eye of the Tiger </Song>
        <Artist>Survivor</Artist>
        <Album>Eye of the Tiger </Album>
    </Body>
</Message>
```

The message processing engine 114 may determine that the message is formatted using XML and use an XML parser to obtain the values for the tags "<Artist>", "<Song>", and "<Album>". As a result, the message processing engine 114 can determine that the author "J. Doe" wants the song "Eye of the Tiger" by artist "Survivor" from album "Eye of the Tiger" to be played.

Figure 6:
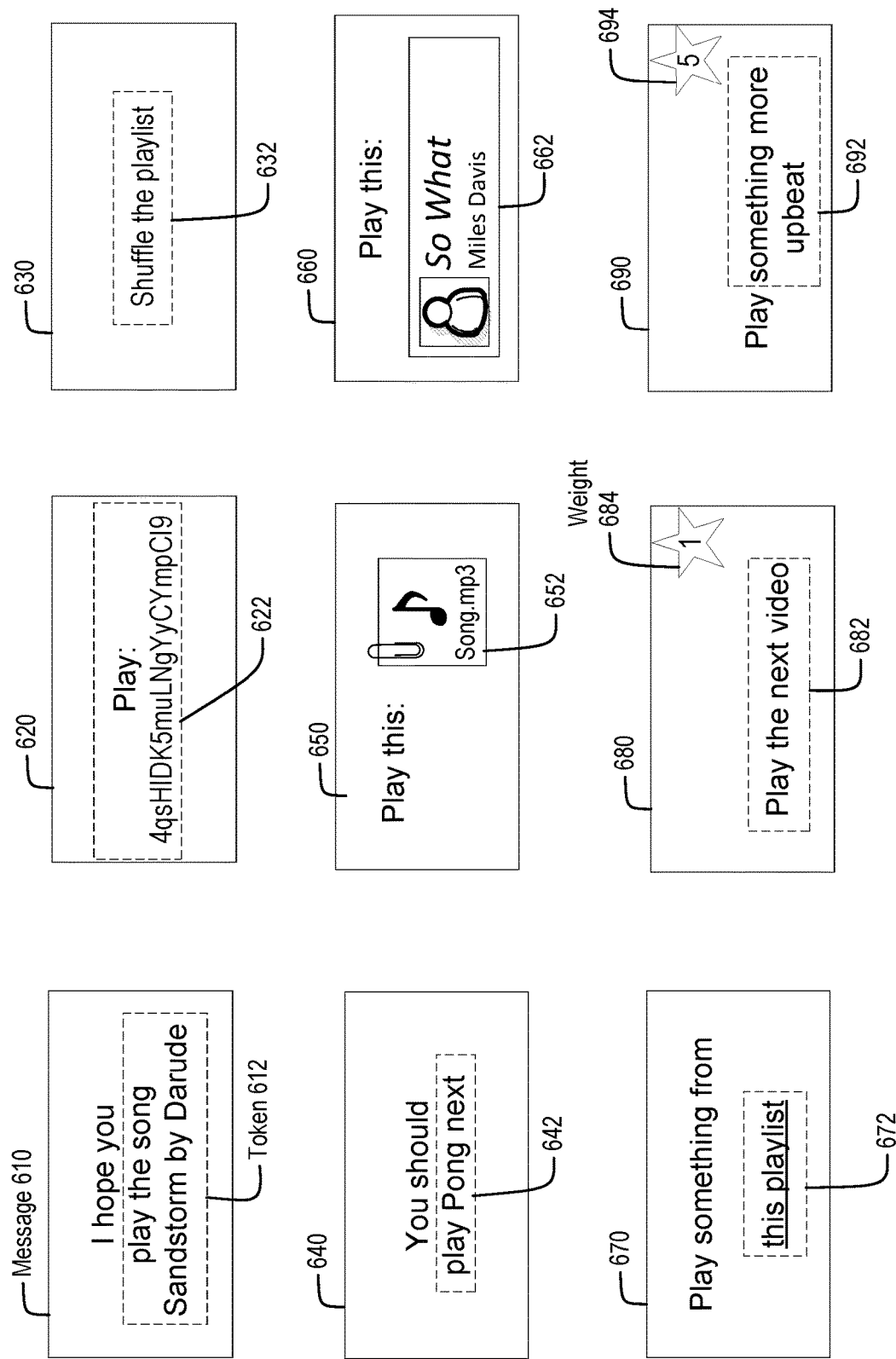
FIG. 6 illustrates example messages and tokens.

Examples of messages and tokens are shown and described in relation to FIG. 6.

FIG. 6 illustrates example messages and tokens, including message 610, message 620, message 630, message 640, message 650, message 660, message 670, message 680, message 690, token 612, token 622, token 632, token 642, token 652, token 662, token 672, token 682, token 692, weight 684, and weight 694.

Message 610 recites "I hope you play the song Sandstorm by Darude" and includes a token 612. The recitation of "play the song Sandstorm by Darude" may be the token 612. The message processing engine 114 may parse the message 610 and identify that the word "play" may indicate a request. For example, the message processing engine 114 may compare the contents of the message with known action request words or phrase patterns. The message processing engine 114 may parse the message 610 and identify "Sandstorm" as a song and "Darude" as an artist. For example, the message processing engine 114 can identify known or suspected artists, songs, albums, or other indicia of media content items in the message. For instance, the message processing engine 114 may compare the contents of the message with a database (or other data structure) of known or playable media content items. The database may further include artists, albums or other metadata associated with media content items. If there is a match between the content and the database, the message processing engine 114 may then identify a media content item (in this case a song) associated with the token 614 and identify "Sandstorm" by "Darude" as the media content item. The message processing engine 114 may then send a command to the media-playback engine 112 instructing the media-playback engine 112 to take the action (i.e., play) with regard to the media content item (i.e., Sandstorm by Darude) in the message 610.

Message 620 recites "Play: 4qsHIDK5muLNgYyCYmpCI9" and includes a token 622.

The recitation "4qsHIDK5muLNgYyCYmpCI9" may be the token 622. In some examples, the media-playback engine 112 or a service associated therewith may associate media content items with a particular identifier. The identifier may be used to look up media content items for playback. In some examples, the identifier may simply be the name of the media content item or a concatenation of metadata for the media content item (e.g., "MilesDavisKindOfBlue-SoWhat"). In other example, the identifier may begin with a particular set of characters (e.g., identifiers may begin with the string: "ID:"). In the illustrated example message 620, the token 622 includes the identifier: "4qsHIDK5muLNgYyCYmpCI9". For example, the identifier may be the result of hashing data regarding the media content item (e.g., an MD5 or SHA hash of the media content item and/or metadata associated therewith). In some examples, there may be identifiers associated with actions that may be taken by the media-playback engine 112 (e.g., play, pause, or shuffle). The message processing engine 114 can parse the message content matching a format for such an identifier. For example, the identifier may follow a particular format, such as being a certain number of characters having a particular formatting (e.g., letters and numbers without special characters). The message processing engine 114 can parse the message 620, identify the token 622 as being an identifier associated with a particular media content item, and cause the media-playback engine 112 to take an action based on the identifier.

Message 630 recites "Shuffle the playlist" and includes a token 632. The recitation "Shuffle the playlist" may be the token 632. While tokens may be associated with particular media content items, they can also be associated with particular actions. In this instance, token 632 is associated with a shuffle-playlist action that can be taken on by the media playback engine 112. For example, the message processing engine 114 can parse the message to determine whether the message contains particular commands such as play pause skip track shuffle. It may also parse the message for particular objects that may be the target of the command such as a track (e.g., skip the next track) or a playlist (e.g., shuffle playlist).

Message 640 recites "You should play Pong next" and includes a token 642. The recitation "play Pong next" may be the token 642. Here, the message 640 may be considered ambiguous with regard to whether the author wants the presenter to play the ATARI video game named PONG or a media content item associated with that name. To help resolve these or other ambiguities, the message processing engine 114 may analyze the message 640 and determine a confidence level with regard to whether the message contains content that the media-playback engine 112 can take an action on. This confidence level can be based on a variety of factors including but not limited to a context in which the request is being made. For example, if the media-playback engine 112 has a playlist with a particular name or the message contains a request that includes content associated with content within a media library associate with the presenter, such factors may increase the confidence that a particularly requested item is something that the media-playback engine 112 can take an action on. By contrast, the context may indicate that the requested item is actually a game or something else that the media-playback engine 112 cannot take an action based on (e.g., because the requested item is within a video-game library associated with the presenter), then the confidence may be relatively lower. Depending on whether the confidence exceeds a threshold, the message processing engine 114 may take a particular action, such as instructing the media-playback engine 112 to take an action (e.g., play a media content item named "Pong"), ignore the message, inform the author that the confidence level is low, or take another action.

Message 650 recites "Play this:", includes an attachment, and includes a token 652. The attachment may be the token 652. For example, the message processing engine 114 may parse the message 652 determine whether or not it contains an attachment. If an attachment is detected, then the message processing engine 114 can determine a confidence regarding whether the attachment contains a media content item that can be played. For example, the message processing engine 114 can analyze the file name extension of the attachment to determine whether it contains a file name extension associated with media content items (e.g., a file name extension associated with music, such as .wav, .mp3, .flac, or .aac, or a file name extension associated with video, such as .mp4, .avi, .mov, or .wmv). In some examples, the message processing engine 114 may pass the attachment to the media-playback engine 112 for playback. In some examples the message processing engine 114 may be configured to ignore or otherwise not process attachments in order to reduce security risks associated therewith (e.g., the file may contain malware). In some examples, the message processing engine 114 may run antivirus or other security check on the attachment. In some examples, the message processing engine 114 may only acknowledge attachments from messages authored by certain users (e.g., administrators). In some examples, the message processing engine 114 may fingerprint the media content item in the attachment and use that fingerprint to identify a media content item associated with the attachment and then have the media-playback engine 112 play the media content item associated with the fingerprint of the attachment. In this manner, the message processing engine 114 may alleviate some security or other risks by playing a media content item associated with the fingerprint of the attachment (e.g., playing it from the media server 180), if any, rather than directly playing the attachment. This may also alleviate some licensing concerns whereby rather than playing back a received media content item that may have a variety of licensing restrictions, the fingerprint can be used to identify the media content item and the media-playback engine 112 can be used to playback the item in a manner consistent with a license or other permission structure.

Message 660 recites "Play this:", includes a rich data object. The rich data object may be the token 662. Rich data objects can be data objects created by a particular application or operating system that represent data in a more rich way than just text. For example, some operating systems and applications display URLs as rich links that display a preview of the destination of the link (e.g. using FACEBOOK OPENGRAPH PROTOCOL data or TWITTER CARD protocol data) when a user attempts to send a URL. The rich data object may be a rich data object associated with a particular song, artist, album, playlist, or other media content item. For example, as shown the rich data object represents song "Song" by artist "Artist".

In some examples, the message processing engine 114, the media-playback engine 112 or another component of the system 100 may automatically convert particular tokens to rich data objects. This can, for example, improve the readability or aesthetics of the messages when presented as part of the webcast. For instance, the message processing engine 114 may convert the token 622, which is a string of letters and numbers, into a rich data object that identifies the media content item associated with that token 622 to improve the appearance of the message when or if it is displayed in the webcast 118.

Message 670 recites "Play something from this playlist", with "this playlist" including a link to a playlist. The link to the playlist may be the token 672. The message processing engine 114 can identify that the author of the message 670 would like to play a particular playlist and that there is a link. The message processing engine 114 can parse the message 670 and determine that the link is associated with the request to play the playlist. The message processing engine 114 can access the link and, based on the linked resource, cause the media-playback engine 112 to take a particular action. In an example, the message processing engine 114 can parse the URI of the link to determine content or an action associated with the link.

Message 680 recites "Play the next video", includes a token 682, and includes a weight 684 of one. The phrase "Play the next video" can be the token 682. The message processing engine 114 can parse the message 680, identify the phrase as the token 682, and instruct the media-playback engine 112 to take an action based on the token 682. The message 680 also includes the weight 684. The messages can be given a particular weight by the message processing engine 114, the messaging platform 108, or another platform or service. Based on the weight, the message processing engine114 and the media-playback engine 112 can take particular actions. For example, the weight 684 is one, which can be a relatively low weight depending on the weight scale.

Message 690 recites "Play something more upbeat", includes a token 692, and includes a weight 694 of five. The phrase "Play something more upbeat" may be the token 692. An example, the message processing engine 114 may identify the phrase and understand that the author is requesting a change in the particular type of media content item being played. In some examples, the message processing engine 114 may then cause the media-playback engine 112 take a particular action. For example, the media-playback engine 112 or the message processing engine 114 may select a media content item with the particular characteristics requested. In this case, something more upbeat.

The message 690 has a weight 694 of five. Depending on a weight scale used, the weight 694 of five can be relatively higher than the weight 684 of one of the message 680. In some examples, if the message 690 came in at the same or a similar time as message 680, then depending on the settings of the message processing engine 114, the message processing engine 114 may give preferential treatment to message 690 because of its relatively higher weight.

Returning to FIG. 4, once a relevant token is detected and other processing is performed, the message processing engine 114 can send a command to the media-playback engine 112 based on the token. For example, where the token indicates a request that a particular media content item be played, then the message processing engine 114 can send a command to the media-playback engine 112 to play the particular media content item.

Operation 420, which recites "take action based on message", can follow operation 418. The media-playback engine 112 can take an action based on the received message 411. For example, the media-playback engine 112 can receive a command from the message processing engine 114 based on the content of the message 411. The media-playback engine 112 can then take an action based on the received command, such as play a particular media content item. The media-playback engine 112 need not directly receive a command from the message processing engine 114. For example, in some embodiments, the media-playback engine 112 can play from a playlist modifiable by the message processing engine 114 or another component. The message processing engine 114 can modify the playlist and by modifying the playlist based on the received message 411, the message processing engine 114 can control the media-playback engine 112 based on the message 411 and cause the media-playback engine 112 to take an action based on the message 411.

Operation 422, which recites "provide metadata", may follow operation 420. The media-playback engine 112 may have a variety of metadata 423 regarding the operation of the media-playback engine 112. For example, the metadata 423 can include metadata regarding a currently-playing media content item (e.g., title, artist, album, genre, year released, track number, and other data), data regarding the playback of the currently-playing media content item (e.g., length of media content item, current position within media content item, whether the item is playing, whether the media item is paused, a current volume, a current brightness, a current playback speed, or a person who recommended the item), data regarding playback of other media items (e.g. data regarding media content items in a queue or playlist), or other metadata.

Some or all of the metadata 423 or data based thereon may be provided to the webcast compositing engine 116, for example, for inclusion in the webcast 118. For example, as previously described with regard to the webcast compositing engine 116, the metadata 423 can be provided as input data 502 to the webcast compositing engine 116. For example, the metadata 423 can be sent directly to the webcast compositing engine 116. In another example, the media-playback engine 112 may host a webpage on a localhost that provides the metadata 423.

In some examples, operation 422 can also provide synchronization data 425. For example, the synchronization data 425 can be provided to a media-playback engine 112 of an audience member's device 120 and allow that media-playback engine 112 to synchronize its own playback of the media content item with playback of the media content item by the media-playback engine 112 of the presenter's device 110. The synchronization data 425 can include, for example, identifiers of the currently playing song or other media content item, a current playback position of the media content item, a to be played next media content item, or other data. In some examples, the synchronization data 425 can include, for example, data to allow for the correction of a delay between the visual data shown in a webcast and the playback of the media content item at the presenter's device 110. For example, there may be a delay between when the visual data of the webcast shows the presenter hearing the playback of the media content item (e.g., the presenter reacting to the playback of media content item by, for example, nodding his or her head in time to music, reacting to a particular aspect of the media content item) and when the synchronization data 425 instructs the audience device to play back the media content item. To overcome or otherwise alleviate the delay, the synchronization data 425 can include information regarding compensation for the delay. For example, there can be an estimate of the delay in the estimate can be used as an offset for playback. In other examples, information regarding delay correction need not be included in the synchronization data 425.

While the synchronization data 425 is shown as being provided by the media-playback engine 112, the synchronization need not be provided by the media-playback engine 112 or need not be provided only the media-playback engine 112. For example, the synchronization data 425 may be provided by the media server 180 to the audience member's device 120. For instance, the media-delivery system 104 may provide media content items to both the presenter's device 110 and the audience member's device 120. In another example, the synchronization data 425 can be provided from the media-playback engine 112 of the presenter's device 110 to the media server 180. The media server 180 can then use the synchronization data 425 to provide a content stream of its own in a manner synchronized with the synchronization data 425. For example, a media-playback engine 112 of the audience member's device 120 can connect to a stream provided by the media server 180 and play media content items from that stream.

Operation 424, which recites "play media content item", may follow operation 422. At operation 424, media-playback engine 112 of the audience member's device 120 can play a media content item in a manner synchronized with the playback of the media content item with the media-playback engine 112 of the presenter's device 110. In an example, the media-playback engine 112 of the audience member's device 120 can receive the synchronization data 425 and initiate playback of a media content item in a synchronized manner.

While the media content item can be played at the audience device 120 using the synchronization data 425, in some examples the media content item is provided as part of the webcast 118 (e.g., composited into the webcast or received as audio through the presenter's microphone). In such examples, the audience member may choose to not play the media content item locally on his or her device 120 using the synchronization data 425 and instead allow the media content item to be played through the webcast 118.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims

What is claimed is:

1. A method comprising:
    playing, using a media content engine, a first media content item for a first user;
    enabling the first user to manage playback of the media content engine;
    receiving, at a message parsing engine, instant message content sent from a second user to the first user;
    identifying, with the message parsing engine, a play media content item action and an indicia of a second media content item in the instant message content, the second media content item being different from the first media content item;
    displaying text content of the instant message content to the first user; and
    responsive to receiving a manage playback action from the first user interacting with the displayed text content of the instant message content, instructing a media-playback engine of the first user to play the second media content item.

2. The method of claim 1, wherein:
    the text content includes the indicia of the second media content item.

3. The method of claim 1, further comprising providing webcast content to a remote webcast host, wherein the first user is a presenter of the webcast content and the second user is an audience member of the webcast content.

4. The method of claim 3, wherein the webcast is a live gaming session.

5. The method of claim 1, wherein identifying the indicia of the second media content item includes:
    identifying a link within the instant message content linking to a linked resource; and
    determining a linked media content item associated with the linked resource.

6. The method of claim 1, further comprising:
    creating a connection to a stream of data from an instant messaging platform,
    wherein receiving the instant message content comprises receiving the instant message content over the connection to the stream of data.

7. A system comprising:
    one or more processors; and
    a computer-readable medium,
    wherein the computer-readable medium includes instructions that, when executed by the one or more processors, cause the one or more processors to:
        receive instant message content from an instant messaging platform, the instant message content being for a first user and from a second user;
        parse the instant message content to identify a token in the instant message content, wherein the token is associated with a play action and identifies a media content item;
        display text content of the instant message content to the first user;
        enable the first user to manage playback of a media-playback engine of the first user;
        receive a manage playback action from the first user with respect to the instant message content interacting with the displayed text content of the instant message content; and
        send a command to the media-playback engine that instructs the media-playback engine to play the media content item.

8. The system of claim 7, wherein the instant message content identifies the media content item by name.

9. The system of claim 7, wherein the instant message content identifies the media content item with a link.

10. The system of claim 7, wherein the instructions include webcast engine instructions that, when executed by the one or more processors, cause the one or more processors to provide webcast content to a remote webcast host.

11. The system of claim 10, wherein the first user is a presenter of the webcast content and the second user is an audience member of the webcast content.

12. The system of claim 7, wherein the instructions include media content engine instructions that, when executed by the one or more processors, cause the one or more processors to operate the media-playback engine.

13. The system of claim 7, wherein to enable the first user to manage playback includes to: provide a user interface to allow the first user to manage media content item playback.

14. The system of claim 13, wherein the user interface includes one or more hotkeys, keyboard shortcuts, voice commands, or user interface elements that enable the first user to manage playback.

15. A system comprising:
a device having one or more processors; and
a non-transitory computer-readable medium including:
- message processing engine instructions that, when executed by the one or more processors, cause the one or more processors to:
  - receive an instant message configured to be displayed to a user of the device;
  - parse the instant message for a token;
  - display text content of the instant message to the user; and
  - send a command to a media-playback engine of the device that instructs the media-playback engine to play a token media content item associated with the token;
- media-playback engine instructions that, when executed by the one or more processors, cause the one or more processors to:
  - switch from playing a current media content item to play the token media content item responsive to a manage playback action from the user interacting with the displayed text content of the instant message content; and
- webcast instructions that, when executed by the one or more processors, cause the one or more processors to:
  - composite a webcast including video game content; and
  - provide the webcast to a remote webcast host.

16. The system of claim 15, wherein the device is a video game console.

17. The system of claim 15, wherein to composite the webcast includes to add audio output from the media-playback engine to the webcast.

18. The system of claim 15, wherein the token identifies the media content item by name.

19. The system of claim 15, wherein the token identifies the media content item with a link.

20. The system of claim 15, wherein the webcast is a live gaming session.

* * * * *